(12) United States Patent
Thomsen et al.

(10) Patent No.: US 7,560,402 B2
(45) Date of Patent: Jul. 14, 2009

(54) CLEAR GLASS COMPOSITION

(75) Inventors: Scott V. Thomsen, South Lyon, MI (US); Ksenia A. Landa, Brownstown, MI (US); Leonid M. Landa, legal representative, Brownstown, MI (US); Richard Hulme, Rochester Hills, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 470 days.

(21) Appl. No.: 11/543,999

(22) Filed: Oct. 6, 2006

(65) Prior Publication Data

US 2008/0085827 A1   Apr. 10, 2008

(51) Int. Cl.
*C03C 3/095* (2006.01)
*C03C 3/087* (2006.01)

(52) U.S. Cl. .................. 501/64; 501/70; 501/71
(58) Field of Classification Search ............ 501/64, 501/70, 71
See application file for complete search history.

(56) References Cited

U.S. PATENT DOCUMENTS

| | | | |
|---|---|---|---|
| 5,264,400 A * | 11/1993 | Nakaguchi et al. ......... 501/71 |
| 6,407,021 B1 | 6/2002 | Kitayama et al. | |
| 6,461,736 B1 | 10/2002 | Nagashima et al. | |
| 6,548,434 B2 | 4/2003 | Nagashima | |
| 6,573,207 B2 | 6/2003 | Landa et al. | |
| 6,610,622 B1 * | 8/2003 | Landa et al. .................. 501/64 |
| 6,716,780 B2 | 4/2004 | Landa et al. | |
| 6,927,186 B2 | 8/2005 | Hulme et al. | |
| 6,949,484 B2 * | 9/2005 | Landa et al. .................. 501/64 |
| 7,030,047 B2 * | 4/2006 | Landa et al. .................. 501/64 |
| 7,037,869 B2 * | 5/2006 | Landa et al. .................. 501/64 |
| 7,144,837 B2 * | 12/2006 | Landa et al. .................. 501/71 |
| 2003/0114290 A1 * | 6/2003 | Landa et al. .................. 501/64 |
| 2003/0144126 A1 | 7/2003 | Kitayama et al. | |
| 2003/0216241 A1 * | 11/2003 | Landa et al. .................. 501/64 |
| 2004/0116271 A1 | 6/2004 | Thomsen et al. | |
| 2004/0180775 A1 * | 9/2004 | Landa et al. .................. 501/64 |
| 2004/0209757 A1 * | 10/2004 | Landa et al. .................. 501/64 |
| 2005/0188725 A1 | 9/2005 | Tullman et al. | |
| 2008/0090718 A1 * | 4/2008 | Landa et al. .................. 501/64 |

FOREIGN PATENT DOCUMENTS

| | | |
|---|---|---|
| JP | 07-109147 | 4/1995 |
| JP | 10-226534 | 8/1998 |
| JP | 11-60269 | 3/1999 |
| WO | WO 95/13993 | 5/1995 |
| WO | 01/66477 | 9/2001 |
| WO | WO 03/064342 | 8/2003 |
| WO | WO 2005/082799 | 9/2005 |

* cited by examiner

*Primary Examiner*—Karl E Group
*Assistant Examiner*—Elizabeth A Bolden
(74) *Attorney, Agent, or Firm*—Nixon & Vanderhye P.C.

(57) ABSTRACT

Glass is provided so as to have high visible transmission and/or fairly clear or neutral color. In certain example embodiments, the clear glass includes a low amount of iron coupled with zinc oxide and/or erbium oxide in amounts designed to provide a neutral color. While the erbium oxide is used to provide for neutral color, the zinc oxide binds sulfur into whitish-colored zinc sulfide thereby reducing the amount of sulfur that binds/bonds with iron in the glass to form sulfides of iron which is/are brownish in color. Thus, the use of the zinc oxide helps make the glass more neutral in color. In certain example embodiments, the use of the erbium oxide brings the a* color value of the resulting glass closer to zero, whereas the use of the zinc oxide brings the b* value of the resulting glass closer to zero.

20 Claims, 1 Drawing Sheet

EXAMPLES for this invention

| Glass composition, wt.% | Regular clear | PPG Starphire | 1 | 2 | 3 | 4 | 5 |
|---|---|---|---|---|---|---|---|
| SiO2 | 71.85 | 73.71 | 72.73 | 73.33 | 71.80 | 71.98 | 72.13 |
| Al2O3 | 0.66 | 1.48 | 0.65 | 1.51 | 0.15 | 0.15 | 1.01 |
| Fe2O3 | 0.088 | 0.022 | 0.023 | 0.021 | 0.021 | 0.017 | 0.014 |
| CaO | 9.18 | 10.32 | 9.41 | 9.89 | 8.88 | 8.03 | 8.45 |
| MgO | 3.84 | 0.00 | 2.79 | 0.29 | 3.72 | 3.86 | 3.99 |
| Na2O | 13.84 | 14.35 | 14.02 | 14.60 | 13.74 | 13.38 | 12.45 |
| K2O | 0.08 | 0.02 | 0.02 | 0.02 | 0.31 | 0.43 | 0.02 |
| Li2O | 0.00 | 0.00 | 0.00 | 0.00 | 0.00 | 0.75 | 1.22 |
| ZnO | 0.00 | 0.00 | 0.00 | 0.56 | 0.00 | 1.12 | 0.51 |
| SrO | 0.00 | 0.00 | 0.00 | 0.00 | 1.05 | 0 | 0.00 |
| SO3 | 0.21 | 0.13 | 0.27 | 0.31 | 0.35 | 0.29 | 0.27 |
| TiO2 | 0.04 | 0.01 | 0.01 | 0.01 | 0.01 | 0.01 | 0.01 |
| Cr2O3 | 0.0009 | 0.0000 | 0.0000 | 0.0000 | 0.0000 | 0.0000 | 0.0000 |
| Co3O4 | 0.0000 | 0.0000 | 0.0000 | 0.0000 | 0.0000 | 0.00005 | 0.0000 |
| Er2O3 | 0.0000 | 0.0000 | 0.0140 | 0.0240 | 0.0170 | 0.0120 | 0.0090 |
| Spectral properties at 6 mm | | | | | | | |
| %Tvis (Lt D65) | 89.49 | 91.27 | 91.39 | 91.48 | 91.63 | 91.76 | 91.80 |
| %UV (300-400) | 76.80 | 89.15 | 88.95 | 88.67 | 88.16 | 87.92 | 87.75 |
| %Tsol (ISO 9050) | 81.50 | 89.22 | 89.48 | 90.01 | 90.49 | 90.85 | 91.04 |
| Ltc (Y) | 89.46 | 91.26 | 91.38 | 91.47 | 91.61 | 91.75 | 91.78 |
| L* (D 65 10 degr.) | 95.79 | 96.52 | 96.56 | 96.59 | 96.61 | 96.65 | 96.68 |
| a* (D 65 10 degr.) | -1.54 | -0.29 | -0.15 | -0.03 | -0.05 | -0.02 | -0.01 |
| b* (D 65 10 degr.) | 0.37 | 0.11 | 0.05 | 0.06 | 0.06 | -0.01 | 0.02 |
| %FeO (spectral) | 0.0208 | 0.0046 | 0.0032 | 0.0024 | 0.0015 | 0.00011 | 0.0008 |

Fig. 1

CLEAR GLASS COMPOSITION

Certain example embodiments of this invention relate to a clear glass composition. In certain example embodiments of this invention, a glass having high light transmittance in the visible range and/or fairly neutral color is provided. In certain example embodiments, the glass includes a low amount of iron coupled with zinc and/or erbium designed to provide a neutral color. Such glass compositions are thus useful, for example, in architectural windows, patterned glass applications, solar cells, and/or automotive windows.

BACKGROUND OF THE INVENTION

Glass that is fairly clear in color and highly transmissive to visible light (e.g., at least 75% transmissive, or even more preferably at least 80% transmissive) is sometimes desirable. One way of achieving such as glass is to use very pure base glass materials (e.g., substantially free of colorants such as iron). However, base materials with a high degree of purity are expensive and thus not always desirable and/or convenient. In other words, for example, the removal of iron from glass raw materials has certain practical and/or economical limits.

As can be appreciated from the above, glass raw materials (e.g., silica, soda ash, dolomite, and/or limestone) typically include certain impurities such as iron. The total amount of iron present is expressed herein in terms of $Fe_2O_3$ in accordance with standard practice. However, typically, not all iron is in the form of $Fe_2O_3$. Instead, iron is usually present in both the ferrous state ($Fe^{2+}$; expressed herein as FeO, even though all ferrous state iron in the glass may not be in the form of FeO) and the ferric state ($Fe^{3+}$). Iron in the ferrous state ($Fe^{2+}$; FeO) is a blue-green colorant, while iron in the ferric state ($Fe^{3+}$) is a yellow-green colorant. The blue-green colorant of ferrous iron ($Fe^{2+}$; FeO) is of particular concern when seeking to achieve a fairly clear or neutral colored glass, since as a strong colorant it introduces significant color into the glass. While iron in the ferric state ($Fe^{3+}$) is also a colorant, it is of less concern when seeking to achieve a glass fairly clear in color since iron in the ferric state tends to be weaker as a colorant than its ferrous state counterpart.

In view of the above, it is apparent that there exists a need in the art for a new glass composition which allows a glass to have fairly clear color and/or high visible transmission, without having to resort to extremely pure (i.e., free of iron) glass raw materials.

A known clear glass is PPG's Starphire glass; see the composition thereof set forth in FIG. 1. Unfortunately, PPG Starphire glass (at 6 mm thick) can only achieve an a* color value of −0.29 and a b* value of 0.11. This color is not neutral enough for certain applications. In other words, a* and/or b* value(s) closer to zero are desired in certain applications.

Another known clear glass is set forth as "Regular clear" glass in FIG. 1. Again, unfortunately, this glass can only achieve an a* color value of −1.54 and a b* value of 0.37. This color is not neutral enough for certain applications. In other words, a* and/or b* value(s) closer to zero are desired in certain applications.

U.S. Pat. No. 6,949,484 (commonly owned and hereby incorporated herein by reference) discloses another clear glass composition. However, the examples set forth in the '484 patent cannot achieve a combination of high visible transmission (e.g., at least about 90%) and very neutral a* and b* color values. Moreover, large amounts expensive cerium oxide are required in certain examples of the '484 patent.

U.S. Pat. No. 6,716,780 (commonly owned and hereby incorporated herein by reference) discloses a grey glass composition. Unfortunately, the examples set forth in the '780 patent cannot achieve a combination of high visible transmission (e.g., at least about 90%) and very neutral a* and b* color values.

In view of the above, it will be apparent that there exists a need in the art for a clear glass composition capable of realizing a combination of high visible transmission (e.g., at least about 90%) and very neutral a* and b* color values so as to provide very clear color to viewers and the like if desired.

SUMMARY OF EXAMPLE EMBODIMENTS OF INVENTION

In certain example embodiments of this invention, a clear glass composition is provided that is capable of realizing a combination of (a) high visible transmission (e.g., at least about 90%), and (b) very neutral a* and b* color values so as to provide very clear color to viewers and the like.

In certain example embodiments of this invention, a glass is provided having a visible transmission ($T_{vis}$) of at least 80% (more preferably at least 85%, even more preferably at least 90%, and most preferably at least about 91% or 91.5%). Such transmission values may be achieved at, for example, a non-limiting reference glass thickness of about 6 mm. In certain example embodiments, the glass also can have a transmissive a* color value of from about −0.20 to +0.15, more preferably from about −0.15 to +0.10, even more preferably from about −0.10 to +0.05, and sometimes from about −0.06 to +0.02. In certain example embodiments, the glass also can have a transmissive b* color value of from about −0.15 to +0.20, more preferably from about −0.10 to +0.15, even more preferably from about −0.10 to +0.10, and sometimes from about −0.05 to +0.06. These very neutral a* and b* color values provide for a very clear glass having substantially no coloration in certain example embodiments of this invention.

In certain example embodiments of this invention, the clear glass includes a low amount of iron coupled with zinc oxide and/or erbium oxide in amounts designed to provide a neutral color. It has been found that the erbium oxide is used to provide for neutral color. Moreover, it has been found that the zinc oxide binds sulfur (S, or $S^{2-}$) (e.g., the S, or $S^{2-}$, coming from sodium sulfate or salt cake, or the like used in the glass batch) into ZnS which is white in color. The use of zinc oxide to bind sulfides into white colored zinc sulfide (e.g., ZnS) is advantageous in that it reduces the amount of sulfur (S) that binds/bonds with iron in the glass to form sulfides of iron which is/are brownish in color. Thus, the use of the zinc oxide helps make the glass more neutral in color. In certain example embodiments, the use of the erbium oxide brings the a* color value of the resulting glass closer to zero, whereas the use of the zinc oxide brings the b* value of the resulting glass closer to zero. Such glass compositions are useful, for example, in architectural windows, patterned glass applications, solar cells, and/or automotive windows.

In certain example embodiments of this invention, there is provided a glass comprising:

Ingredient wt. %
$SiO_2$ 67-75%
$Na_2O$ 10-20%
CaO 5-15%
total iron (expressed as $Fe_2O_3$) 0.0005 to 0.20%
erbium oxide 0.0001 to 0.20%
zinc oxide 0.01 to 3% wherein the glass has visible transmission of at least 85%, a transmissive a* color value of from −0.20 to +0.15, and a transmissive b* color value of −0.15 to +0.20.

In other example embodiments of this invention, there is provided a glass comprising:

Ingredient wt. %
SiO$_2$ 67-75%
Na$_2$O 10-20%
CaO 5-15%
total iron (expressed as Fe$_2$O$_3$) 0.0005 to 0.20%
erbium oxide 0.0001 to 0.20%
zinc oxide 0 to 3% wherein the glass has visible transmission of at least 90%, a transmissive a* color value of from −0.20 to +0.15, and a transmissive b* color value of −0.15 to +0.20.

BRIEF DESCRIPTION OF THE DRAWINGS

FIG. 1 is a table comparing glass batch compositions, and characteristics of resulting glasses therefrom, of Example 1-5 of the instant invention compared to conventional "Regular clear" and "PPG Starphire."

DETAILED DESCRIPTION OF CERTAIN EXAMPLE EMBODIMENTS OF THIS INVENTION

Glasses according to different embodiments of this invention may be used, for example, in the automotive industry (e.g., windshields, backlites, side windows, etc.), in architectural window applications, for patterned glass applications, solar cell applications, and/or in other suitable applications.

Certain glasses according to example embodiments of this invention utilize soda-lime-silica flat glass as their base composition/glass. In addition to base composition/glass, a unique colorant portion is provided in order to achieve a glass that is clear in color and/or has a high visible transmission. An exemplary soda-lime-silica base glass according to certain embodiments of this invention, on a weight percentage basis, includes the following basic ingredients:

TABLE 1

EXAMPLE BASE GLASS

| Ingredient | Wt. % |
|---|---|
| SiO$_2$ | 67-75% |
| Na$_2$O | 10-20% |
| CaO | 5-15% |
| MgO | 0-7% |
| Al$_2$O$_3$ | 0-5% |
|  | (or 0-1%) |
| K$_2$O | 0-5% |
| BaO | 0-1% |

Other minor ingredients, including various conventional refining aids, such as SO$_3$, carbon, and the like may also be included in the base glass. In certain embodiments, for example, glass herein may be made from batch raw materials silica sand, soda ash, dolomite, limestone, with the use of salt cake (SO$_3$) and/or Epsom salts as refining agents. Preferably, soda-lime-silica based glasses herein include by weight from about 10-15% Na$_2$O and from about 6-12% CaO.

In addition to the base glass (e.g., see Table 1 above), in making glass according to certain example embodiments of the instant invention the glass batch includes materials (including colorants and/or oxidizers or the like) which cause the resulting glass to be neutral in color and/or have a high visible light transmission. These materials may either be present in the raw materials (e.g., small amounts of iron), or may be added to the base glass materials in the batch (e.g., erbium, zinc, and/or the like). In certain example embodiments of this invention, the resulting glass has visible transmission (T$_{vis}$) of at least 80% (more preferably at least 85%, even more preferably at least 90%, and most preferably at least about 91% or 91.5%); such transmission values may be achieved at, for example, a non-limiting reference glass thickness of about 6 mm.

In certain example embodiments of this invention, the glass melt may be refined and reduced using compounds that contain chemically bonded water; e.g., citric acid, C$_6$H$_8$O$_7$. H$_2$O as a reducing agent with or instead of carbon and/or other carbonaceous organic and/or inorganic compounds; Epsom salt, MgSO$_4$. 7H$_2$O and/or gypsum, CaSO$_4$. 2H$_2$O in combination with or instead of salt cake, NaSO$_4$.

In certain embodiments of this invention, in addition to the base glass, the glass batch comprises or consists essentially of materials as set forth in Table 2 below (in terms of weight percentage of the total glass composition):

TABLE 2

EXAMPLE GLASS BATCH

| Ingredient | General (Wt. %) | More Preferred | Most Preferred |
|---|---|---|---|
| total iron (expressed as Fe$_2$O$_3$): | 0.0005-0.20% | 0.001-0.06% | 0.001-0.05% |
| erbium oxide (e.g., Er$_2$O$_3$): | 0.0001-0.20% | 0.0005-0.05% | 0.009-0.03% |
| zinc oxide (e.g., ZnO): | 0-3% | 0.01-3% | 0.3-2% |
| titanium oxide (e.g., TiO$_2$): | 0-2% | 0-1% | 0.005-0.1% |
| cerium oxide (e.g., CeO$_2$): | 0-0.30% | 0-0.07% | 0-0.003% |
| strontium oxide (e.g., SrO): | 0-3% | 0-2% | 0.1-1.5% (or .1-.6%) |

The batch is melted and glass formed using the known float process. Optionally, in certain example embodiments of the invention, small amounts of other materials may also be added to the batch. In certain example embodiments, the glass also can have a transmissive a* color value of from about −0.20 to +0.15, more preferably from about −0.15 to +0.10, even more preferably from about −0.10 to +0.05, and sometimes from about −0.06 to +0.02. In certain example embodiments, the glass also can have a transmissive b* color value of from about −0.15 to +0.20, more preferably from about −0.10 to +0.15, even more preferably from about −0.10 to +0.10, and sometimes from about −0.05 to +0.06. These very neutral a* and b* color values provide for a very clear glass having substantially no coloration in certain example embodiments of this invention.

The total amount of iron present in the glass batch and in the resulting glass, i.e., in the colorant portion thereof, is expressed herein in terms of Fe$_2$O$_3$ in accordance with standard practice. This, however, does not imply that all iron is actually in the form of Fe$_2$O$_3$ (see discussion above in this regard). Likewise, the amount of iron in the ferrous state (Fe$^{+2}$) is reported herein as FeO, even though all ferrous state iron in the glass batch or glass may not be in the form of FeO. As mentioned above, iron in the ferrous state (Fe$^{2+}$; FeO) is a blue-green colorant, while iron in the ferric state (Fe$^{3+}$) is a yellow-green colorant; and the blue-green colorant of ferrous iron is of particular concern, since as a strong colorant it introduces significant color into the glass which can sometimes be undesirable when seeking to achieve a neutral or clear color.

The proportion of the total iron in the ferrous state (FeO) is used to determine the redox state of the glass, and redox is expressed as the ratio $FeO/Fe_2O_3$, which is the weight percentage (%) of iron in the ferrous state (FeO) divided by the weight percentage (%) of total iron (expressed as $Fe_2O_3$) in the resulting glass. In certain example embodiments of this invention, the glass may have a glass redox value (i.e., $FeO/Fe_2O_3$) of from about 0.05 to 0.30, more preferably from about 0.05 to 0.20, and most preferably from about 0.05 to 0.15.

In order to compensate for the color caused by the ferric iron resulting from the optional presence of one or more oxidizers in the batch, it has been found that adding erbium oxide (e.g., $Er_2O_3$ or any other suitable stoichiometric form) in certain example instances causes the color of the resulting glass to become more clear (e.g., the erbium causes a* to move toward neutral 0). Erbium oxide acts as a pink colorant. In particular, erbium oxide apparently acts to physically compensate for the iron color, thereby making the color of the glass more neutral which is desirable in certain example embodiments, while allowing the glass to still have high visible transmission. In particular, it has been found that the use of such erbium oxide in the glass allows a high transmission and fairly neutral colored glass to be achieved without having to completely eliminate iron from the glass.

Moreover, it has been found that the zinc oxide (e.g., ZnO) binds sulfur (S) (e.g., the S coming from sodium sulfate or salt cake, or the like, used in the glass batch) into ZnS. ZnS is substantially white in color. The use of zinc oxide to bind sulfides into white colored sulfides of zinc (e.g., ZnS) is advantageous in that it consistently reduces the amount of sulfur (S, or $S^{2-}$) that binds/bonds with iron in the glass to form sulfides of iron which is/are brownish in color. Thus, the use of the zinc oxide helps make the glass more neutral in color. In certain example embodiments, while the use of the erbium oxide brings the a* color value of the resulting glass closer to zero, the use of the zinc oxide brings the b* value of the resulting glass closer to zero.

Optionally, an oxide of strontium (Sr) may be provided to improve durability of the glass. The example amounts of SrO which may be used are set forth above. In certain example embodiments, the strontium oxide may be used in place of aluminum oxide, or a portion thereof, in order to improve the durability of the glass. High iron raw materials such as nepheline syenite and/or feldspar may be used in the batch, however, they may be not used in certain examples of this invention to reduce alumina content so as to improve durability in certain example embodiments of this invention. In certain example embodiments, alumina may be optionally introduced as calcined and/or hydrated pure alumina so that the glass contains from about 0-1% alumina ($Al_2O_3$) in certain example embodiments. Again, strontium may be introduced (e.g., 0-0.6%) instead of alumina in order to improve the chemical durability of the glass.

According to certain example embodiments of this invention, the optional presence of a small amount of cerium oxide (e.g., $CeO_2$) as an oxidizer in the glass batch may act as a chemical decolorizer since during melting of the glass batch it causes iron in the ferrous state ($Fe^{2+}$; FeO) to oxidize to the ferric state ($Fe^{3+}$). Accordingly, a significant portion of the optional $CeO_2$ which may be added to the original glass batch prior to the melt can be transformed during the melt into $Ce_2O_3$ which may be present in the resulting glass. The aforesaid oxidation of the iron tends to reduce coloration of the glass, and does not significantly decrease visible light transmission of the resulting glass (in certain instances, this may even causes visible transmission to increase). It is noted that, like $Fe_2O_3$, the phrase "cerium oxide" as used herein refers to total cerium oxide (i.e., including cerium oxide in both the $Ce^{4+}$ and $Ce^{3+}$ states).

It is noted that glass according to certain example embodiments of this invention is often made via the known float process in which a tin bath is utilized. It will thus be appreciated by those skilled in the art that as a result of forming the glass on molten tin in certain exemplary embodiments, small amounts of tin or tin oxide may migrate into surface areas of the glass on the side that was in contact with the tin bath during manufacture (i.e., typically, float glass may have a tin oxide concentration of 0.05% or more (wt.) in the first few microns below the surface that was in contact with the tin bath).

In view of the above, glasses according to certain example embodiments of this invention achieve a neutral or clear color and/or high visible transmission. In certain embodiments, resulting glasses according to certain example embodiments of this invention may be characterized by one or more of the following transmissive optical or color characteristics when measured at a thickness of from about 1 mm -6 mm (most preferably a thickness of about 0.219 inches (5.6 or 6 mm); this is a non-limiting thickness used for purposes of reference only) (Lta is visible transmission %):

TABLE 3

CHARACTERISTICS OF CERTAIN EXAMPLE EMBODIMENTS

| Characteristic | General | More Preferred | Most Preferred |
| --- | --- | --- | --- |
| Lta (Ill. C, 2 deg.): | >=85% | >=90% | >=91 or 91.5% |
| % UV (Ill. C. 2 deg.): | 75-95% | 80-90% | 84-89% |
| % TS (ISO 9050): | >=80% | >=85% | >=90% |
| L* (Ill. D65, 10 deg.): | 90-100 | 93-98 | 95-97 |
| a* (Ill. D65, 10 deg.): | −0.20 to +0.15 | −0.15 to +0.10 | −0.05 to +0.05 |
| b* (Ill. D65, 10 deg.): | −0.15 to +0.20 | −0.10 to +0.15 | −0.05 to +0.05 |

As can be seen from Table 3 above, glasses of certain embodiments of this invention achieve desired features of clear color and/or high visible transmission, while not requiring iron to be eliminated from the glass composition. This may be achieved through the provision of the unique material combinations described herein.

EXAMPLES 1-5

FIG. 1 illustrates the compositions for the glasses of Examples 1-5 according to certain examples of this invention. Examples 1-5 in FIG. 1 are provided for purposes of example only, and are not intended to be limiting. Examples 1-5 are in the five right-hand-most columns of FIG. 1. Examples 1-5 illustrate that the examples of this invention were surprisingly able to realize more neutral coloration (e.g., a* and/or b* closer to zero) than the conventional PPG Starphire and Regular Clear glasses (these two conventional glasses did not include erbium or zinc). These examples were made using a batch redox of from about +3 to +8. Certain of the clear glasses include a low amount of iron coupled with zinc oxide and/or erbium oxide in amounts designed to provide a neutral color. The erbium oxide provides for neutral color, and the zinc oxide advantageously binds sulfur (S) in the glass or glass batch to or into ZnS which is white in color. The use of zinc oxide to bind S into white colored zinc sulfide (e.g., ZnS)

is advantageous in that it reduces the amount of sulfur (S) that binds/bonds with iron in the glass to form sulfides of iron which is/are brownish in color. Thus, the use of the zinc oxide helps make the glass more neutral in color. In certain example embodiments, the use of the erbium oxide brings the a* color value of the resulting glass closer to zero, whereas the use of the zinc oxide brings the b* value of the resulting glass closer to zero. For example, Example 3 has 0.0015% FeO and 0.021% total iron ($Fe_2O_3$) and thus has a glass redox of 0.07. As another example, Example 5 has 0.0008% FeO and 0.014% total iron ($Fe_2O_3$) and thus has a glass redox of about 0.06.

In certain example embodiments of this invention, the glass is substantially free of one, two, three, or all of selenium, cobalt, nickel and/or cerium (including oxides thereof). In certain example embodiments of this invention, glasses include from 0 to 0.01% by weight of one, two, three of all of these elements (including oxides thereof), more preferably no more than 0.0010% of the same, and most preferably no more than 0.0007% of the same, and even more preferably no more than 0.0005% (or no more than 0.0001%) of one, two, three or all of these elements (including oxides thereof).

The terms, and characteristics, of ultraviolet light transmittance (% UV), and the like are well understood terms in the art, as are their measurement techniques. Such terms are used herein, in accordance with their well known meaning, e.g., see U.S. Pat. No. 5,308,805. In particular, ultraviolet transmittance (% UV) is measured herein using Parry Moon Air Mass=2 (300-400 nm inclusive, integrated using Simpson's Rule at 10 nm intervals).

Once given the above disclosure many other features, modifications and improvements will become apparent to the skilled artisan. Such features, modifications and improvements are therefore considered to be a part of this invention, the scope of which is to be determined by the following claims:

What is claimed is:

1. Glass comprising:

| Ingredient | wt. % |
|---|---|
| $SiO_2$ | 67-75% |
| $Na_2O$ | 10-20% |
| CaO | 5-15% |
| total iron (expressed as $Fe_2O_3$) | 0.0005 to 0.20% |
| erbium oxide | 0.0001 to 0.20% |
| zinc oxide | 0.01 to 3% | wherein the glass has visible transmission of at least 85%, a transmissive a* color value of from −0.20 to +0.15, and a transmissive b* color value of −0.15 to +0.20.

2. The glass of claim 1, wherein the glass has visible transmission of at least 90%, a transmissive a* color value of from −0.15 to +0.10, and a transmissive b* color value of −0.10 to +0.15.

3. The glass of claim 1, wherein the glass has visible transmission of at least 91%.

4. The glass of claim 1, wherein the glass has a transmissive a* color value of from −0.10 to +0.05, and a transmissive b* color value of −0.10 to +0.10.

5. The glass of claim 1, wherein the glass further comprises from about 0-1% aluminum oxide, and from about 0.1 to 3% of an oxide of strontium.

6. The glass of claim 1, wherein the glass further comprises from about 0.1 to 1.5% of an oxide of strontium.

7. The glass of claim 1, wherein the glass further comprises from about 0.1 to 0.6% of an oxide of strontium.

8. The glass of claim 1, wherein the glass comprises

| | |
|---|---|
| total iron (expressed as $Fe_2O_3$) | 0.001 to 0.08% |
| erbium oxide | 0.0005 to 0.10% |
| zinc oxide | 0.01 to 2%. |

9. The glass of claim 1, wherein the glass comprises

| | |
|---|---|
| total iron (expressed as $Fe_2O_3$) | 0.001 to 0.06% |
| erbium oxide | 0.0005 to 0.05% |
| zinc oxide | 0.01 to 3%. |

10. The glass of claim 1, wherein the glass comprises

| | |
|---|---|
| total iron (expressed as $Fe_2O_3$) | 0.001 to 0.05% |
| erbium oxide | 0.009 to 0.03% |
| zinc oxide | 0.3 to 2%. |

11. The glass of claim 1, wherein the glass comprises from 0 to 0.07% cerium oxide.

12. The glass of claim 1, wherein the glass comprises from 0 to 0.003% cerium oxide.

13. The glass of claim 1, wherein the glass comprises 0% cerium oxide.

14. The glass of claim 1, wherein the glass is substantially free of cerium, nickel, and selenium.

15. The glass of claim 1, wherein the glass is substantially free of cobalt.

16. The glass of claim 1, wherein the glass has a redox value ($FeO/Fe_2O_3$) of from about 0.05 to 0.15.

17. Glass comprising:

| Ingredient | wt. % |
|---|---|
| $SiO_2$ | 67-75% |
| $Na_2O$ | 10-20% |
| CaO | 5-15% |
| total iron (expressed as $Fe_2O_3$) | 0.0005 to 0.20% |
| erbium oxide | 0.0001 to 0.20% |
| zinc oxide | 0 to 3% |
| strontium oxide | from about 0.1 to 3%. | wherein the glass has visible transmission of at least 90%, a transmissive a* color value of from −0.20 to +0.15, and a transmissive b* color value of −0.15 to +0.20.

18. The glass of claim 17, wherein the glass has visible transmission of at least 91%, a transmissive a* color value of from −0.10 to +0.05, and a transmissive b* color value of −0.10 to +0.10.

19. The glass of claim 17, wherein the glass further comprises from about 0-1% aluminum oxide.

20. The glass of claim 17, wherein the glass further comprises from about 0.1 to 1.5% of an oxide of strontium.

* * * * *